United States Patent [19]

Tappe et al.

[11] 4,416,665
[45] Nov. 22, 1983

[54] WATER-INSOLUBLE AZO DYESTUFF, FOR DISCHARGE PRINTING

[75] Inventors: Horst Tappe, Dietzenbach; Kurt Roth, Hofheim, both of Fed. Rep. of Germany

[73] Assignee: Cassella Aktiengesellschaft, Frankfurt am Main, Fed. Rep. of Germany

[21] Appl. No.: 303,852

[22] Filed: Sep. 21, 1981

[30] Foreign Application Priority Data

Sep. 27, 1980 [DE] Fed. Rep. of Germany ....... 3036576

[51] Int. Cl.$^3$ .................. C09B 29/04; D06P 5/17
[52] U.S. Cl. ........................... 8/464; 8/662; 8/691; 8/922
[58] Field of Search ............. 8/691, 464, 662

[56] References Cited

U.S. PATENT DOCUMENTS 4,062,642 12/1977 Dewcker et al. .................. 8/532
4,252,530 2/1981 Ribka et al. ....................... 8/662
4,265,629 5/1981 Ribka et al. ....................... 8/449
4,271,071 6/1981 Clark ................................. 260/157

FOREIGN PATENT DOCUMENTS 55-133457 10/1980 Japan .
2041391 9/1980 United Kingdom .

Primary Examiner—A. Lionel Clingman
Attorney, Agent, or Firm—Connolly and Hutz

[57] ABSTRACT

Water-insoluble azo dyestuff of the formula

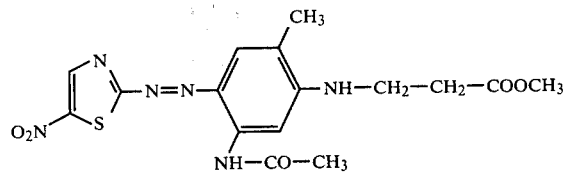

its manufacture and its use as the dyestuff in the dyeing and printing of hydrophobic fiber materials.

2 Claims, No Drawings

WATER-INSOLUBLE AZO DYESTUFF, FOR DISCHARGE PRINTING

The present invention relates to the new, water-insoluble azo dyestuff of the formula I

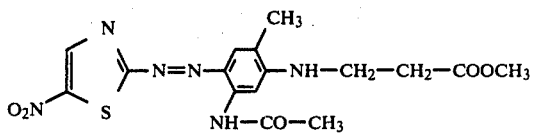

The new dyestuff is prepared by diazotising 2-amino-5-nitrothiazole and coupling the diazotised product with the coupling component of the formula II

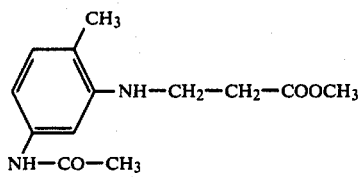

The coupling component of the formula II can readily be obtained by processes known per se, such as are described, for example, in Organikum, page 560, from 2-amino-4-acetylamino-toluene and methyl acrylate.

The dyestuff according to the invention, of the formula I, is outstandingly suitable for dyeing and printing hydrophobic synthetic fibre materials and mixtures of these fibre materials with cellulose fibres. Preferred hydrophobic fibre materials are those consisting of aromatic polyesters, cellulose esters and polyamides, in particular polyesters.

Printing of the said fibre material can be carried out by a method in which the goods printed with the new dyestuff by itself or in mixtures with known disperse dyestuffs are steamed in the presence of a carrier at temperatures between about 100° and 110° C. or, in the absence of a carrier, at 110° C. to 180° C., or they are treated by the so-called thermofixing process at 180°–230° C.

Dyeing of the said fibre material with the dyestuff according to the invention and with dyestuff mixtures which contain the dyestuff according to the invention, is advantageously carried out from an aqueous suspension in the presence of carriers between 80° and 100° C. or, in the absence of carriers, between 100° and 140° C., or by the so-caled thermofixing process at about 180°–230° C. The dyestuff according to the invention is also suitable for dyeing the hydrophobic materials listed above from organic solvents.

The dyestuff according to the invention is particularly well suited for discharge resist processes on polyester, in particularly those processes which are operated with the use of alkaline discharge agents, such as are described, for example, in German Offenlegungsschriften Nos. 2,836,391 and 2,856,283.

The deep dyeings and prints, obtained according to the invention, are distinguished by good general fastness properties; for example, dyeings on polyester are distinguished by good lightfastness and build-up and prints are distinguished by good resistance to thermal migration, above all during finishing with textile auxiliaries.

EXAMPLE (a) 15.2 g of sodium nitrite were added in portions, with stirring, to 100 cm$^3$ of concentrated sulphuric acid, the temperature of the reaction mixture being allowed to rise to 65° C. The solution was then cooled to 5° C., whereupon 200 cm$^3$ of a mixture of 30 cm$^3$ of propionic acid and 170 cm$^3$ of acetic acid were added dropwise, with stirring. The temperature was allowed to rise to 15° C., and this level was maintained during the addition of the remainder.

The nitrosylsulphuric acid mixture prepared in this way was cooled to 0° to 5° C., whereupon 29 g(0.2 mol) of 2-amino-5-nitrothiazole were added in portions, with stirring. 200 cm$^3$ of a propionic acid/acetic acid mixture prepared as indicated above were then added, the temperature of the reaction mixture being maintained at 0° to 5° C. The reaction mixture obtained in this way was then stirred for 3 hours at 0° to 5° and the excess sodium nitrite present in the mixture was decomposed by the addition of 10 to 20 g of urea. The clear diazonium solution thus obtained is added at $-10°$ to $-15°$ C., in the course of 10 minutes, to a solution of 63 g of the coupling component of the formula II in 320 ml of isobutanol. After further stirring for 2 hours, the batch is poured onto 5 l of ice water with stirring, and the dyestuff is filtered off, washed until neutral and dried.

(b) 30 parts of the dyestuff of the formula I, obtained according to section (a) are added in a finely divided state to a padding liquor which, per 1,000 parts, contains 937 parts of water, 3 parts of monosodium phosphate, 10 parts of sodium chlorate and 20 parts of a polymerisation product based on acrylic acid as the anti-migration agent. A polyester fabric based on polyethylenglycol-terephthalate is padded with the padding liquor thus obtained. After the padded fabric has been dried, coverprinting is carried out with a printing paste which, per 1,000 parts, contains 600 parts of an aqueous, 10% strength carob bean flour-ether thickener, 120 parts of water, 80 parts of sodium carbonate, 100 parts of polyethylene glycol 400 and 100 parts of glycerol. After fixing with superheated stream for 7 minutes at 175° C., soaping, subsequent rinsing and drying, a navy blue discharge ground with very good fastness properties is obtained. A very good white ground with sharp contours is obtained in the areas, onto which the printing paste containing sodium carbonate is printed.

(c) 2.0 parts of the finely divided dyestuff of the formula I, obtained according to section (a), are stirred into 2,000 parts of water. The mixture is adjusted to a pH value of 5, using acetic acid, and 4.0 parts by weight of ammonium sulphate and 2.0 parts of a naphthalenesulphonic acid/formaldehyde condensation product are added.

100 parts of a polyester fabric based on polyethylene glycol terephthalate are introduced into the dye liquor thus obtained, and dyeing is carried out for one hour at 130° C.

After subsequent rinsing and drying, deep navy blue dyeings with good fastness properties are obtained.

What is claimed is:

1. In the process for printing hydrophobic fiber materials by the discharge printing process using an azo dyestuff, the improvement comprises said azo dyestuff being the water-insoluble dyestuff of the formula

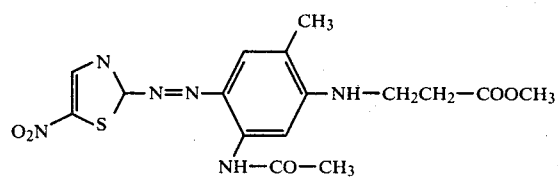
the dyestuff.
2. The process according to claim 1 wherein the discharge is produced by an alkaline discharge agent.
* * * * *